US007112136B2

(12) United States Patent
Anderson et al.

(10) Patent No.: US 7,112,136 B2
(45) Date of Patent: Sep. 26, 2006

(54) SLOT MACHINE WITH REEL SYMBOL MATCHING FEATURE

(75) Inventors: Peter Anderson, Chicago, IL (US); John Flint, Chicago, IL (US); Philip B. Gelber, Glen Ellyn, IL (US); Joel Jaffe, Evanston, IL (US)

(73) Assignee: WMS Gaming Inc., Waukegan, IL (US)

( * ) Notice: Subject to any disclaimer, the term of this patent is extended or adjusted under 35 U.S.C. 154(b) by 707 days.

(21) Appl. No.: 10/160,896

(22) Filed: Jun. 3, 2002

(65) Prior Publication Data

US 2003/0224850 A1 Dec. 4, 2003

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................................... 463/20

(58) Field of Classification Search .............. 463/9–13, 463/16–20

See application file for complete search history.

(56) References Cited

U.S. PATENT DOCUMENTS

| | | | | |
|---|---|---|---|---|
| 6,015,346 | A * | 1/2000 | Bennett | 463/20 |
| 6,089,976 | A | 7/2000 | Schneider et al. | 463/16 |
| 6,261,178 | B1 * | 7/2001 | Bennett | 463/20 |
| 6,309,300 | B1 * | 10/2001 | Glavich | 463/26 |
| 6,319,124 | B1 * | 11/2001 | Baerlocher et al. | 463/20 |
| 6,346,043 | B1 | 2/2002 | Colin et al. | 463/17 |
| 6,347,996 | B1 | 2/2002 | Gilmore et al. | 463/17 |
| 6,364,767 | B1 | 4/2002 | Brossard et al. | 463/20 |
| 6,413,161 | B1 * | 7/2002 | Baerlocher et al. | 463/20 |
| 6,558,254 | B1 * | 5/2003 | Baelocher et al. | 463/20 |
| 6,604,740 | B1 * | 8/2003 | Singer et al. | 273/292 |

OTHER PUBLICATIONS

Article, "Instant Winner", *Strictly Slots*, Aug. 1999, p. 45.
Article, "Yukon Gold", *Strictly Slots*, Jun. 2001, p. 53.

* cited by examiner

*Primary Examiner*—Robert P. Olszewski
*Assistant Examiner*—Milap Shah
(74) *Attorney, Agent, or Firm*—Jenkens & Gilchrist

(57) ABSTRACT

A slot machine conducts a wagering game including a plurality of symbol-bearing reels. The reels are rotated and stopped to randomly place symbols on the reels in visual association with a display area. In response to the displayed symbols including a plurality of symbols selectable by the player, the player is prompted to select one of the selectable symbols. The machine provides an award based on the selected symbol and any other of the displayed symbols associated with the selected symbol.

25 Claims, 7 Drawing Sheets

SLOT MACHINE WITH REEL SYMBOL MATCHING FEATURE

FIELD OF THE INVENTION

The present invention relates generally to gaming machines and, more particularly, to a slot machine including a reel symbol matching feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a “secondary” or “bonus” game that may be played in conjunction with a “basic” game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features and themes for bonus games to satisfy the demands of players and operators. Preferably, such new bonus game features and themes will maintain, or even further enhance, the level of player excitement offered by bonus games heretofore known in the art. The present invention is directed to satisfying these needs.

SUMMARY OF THE INVENTION

A slot machine conducts a wagering game including a plurality of symbol-bearing reels. The reels are rotated and stopped to randomly place symbols on the reels in visual association with a display area. In response to the displayed symbols including a plurality of symbols selectable by the player, the player is prompted to select one of the selectable symbols. The machine provides an award based on the selected symbol and any other of the displayed symbols associated with the selected symbol.

BRIEF DESCRIPTION OF THE DRAWINGS

The foregoing and other advantages of the invention will become apparent upon reading the following detailed description and upon reference to the drawings in which.

Figure 1:
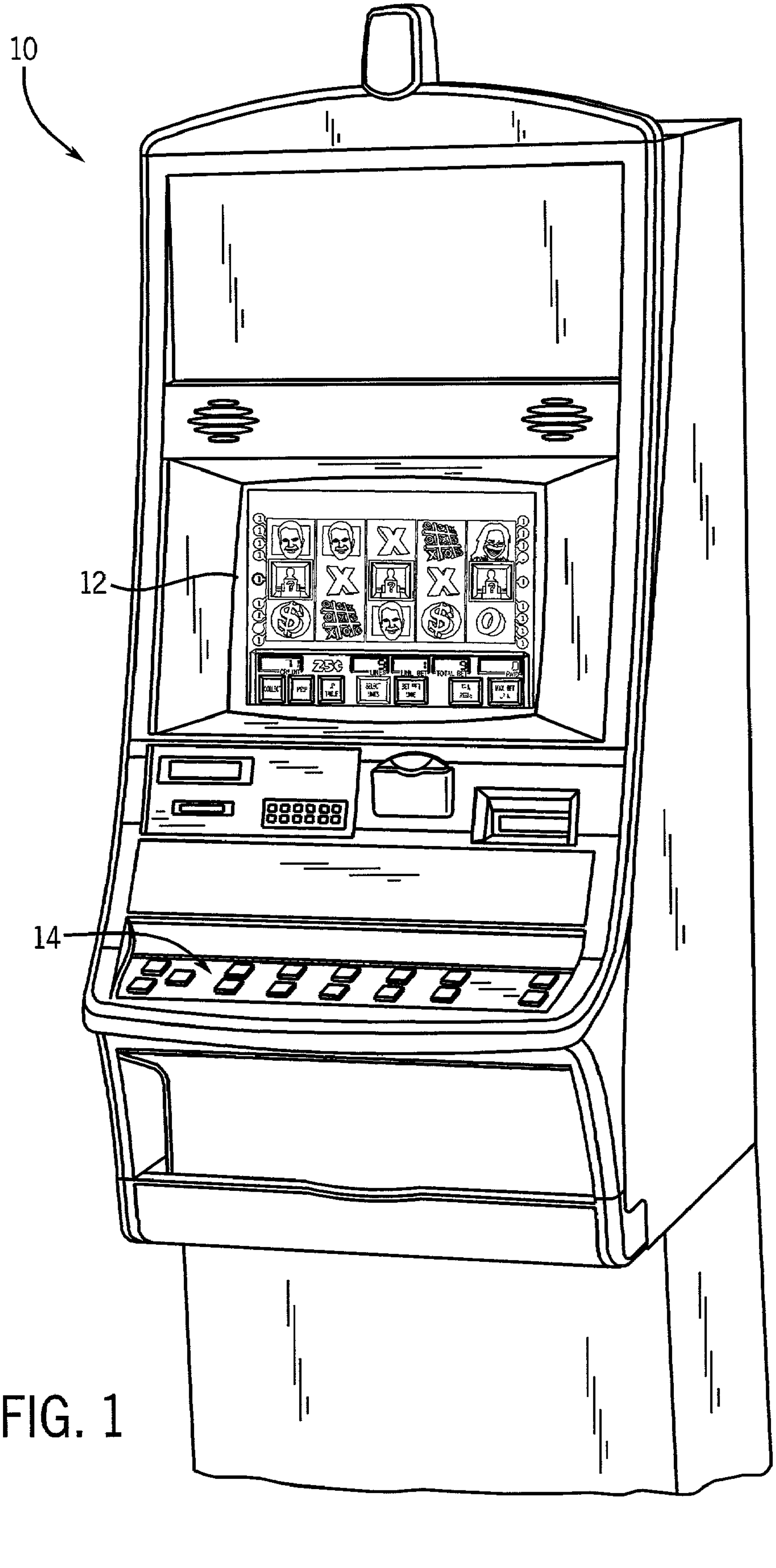
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a gaming machine 10 is operable to play a wagering game having a theme based on the television game show called HOLLYWOOD SQUARES. The wagering game features a basic slot game with five simulated spinning reels and a symbol matching bonus feature triggered by a start-feature outcome in the basic slot game. In addition to the symbol matching feature, the basic slot game may produce certain outcomes for triggering other special features and bonus games.

The gaming machine 10 includes a visual display 12 preferably in the form of a dot matrix, CRT, LED, LCD, electro-luminescent, or other type of video display known in the art. The display 12 preferably includes a touch screen overlaying the monitor. In the illustrated embodiment, the gaming machine 10 is an “upright” version in which the display 12 is oriented vertically relative to the player. Alternatively, the gaming machine may be a “slant-top” version in which the display 12 is slanted at about a thirty-degree angle toward the player of the gaming machine 10.

Figure 2:
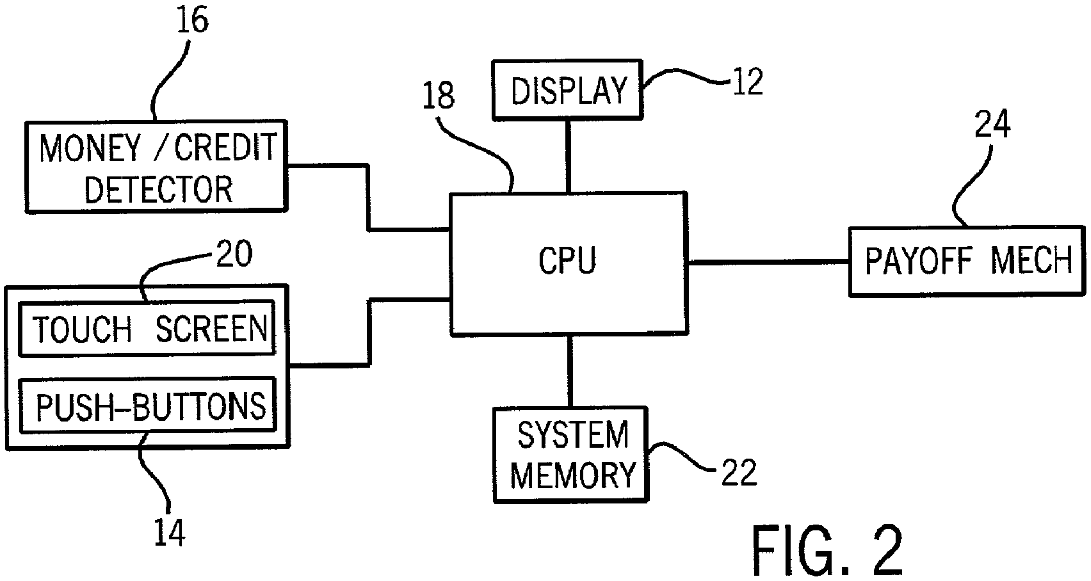
FIG. 2 is a block diagram of a control system suitable for operating the gaming machine.

FIG. 2 is a block diagram of a control system suitable for operating the gaming machine 10. Money/credit detector 16 signals a central processing unit (“CPU”) 18 when a player has inserted money or played a number of credits. The money may be provided by coins, bills, tickets, coupons, cards, etc. Then, the CPU 18 operates to execute a game program that causes the display 12 to display five simulated symbol-bearing reels. The player may select a number of pay lines to play, an amount to wager, and start game play via the touch screen 20 or the push-buttons 14, causing the CPU 18 to set the reels in motion, randomly select a game outcome, and then stop the reels to display symbols corresponding to the pre-selected game outcome. In one embodiment, one of the basic game outcomes triggers a symbol matching bonus feature.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic game or the symbol matching bonus feature. The payoff may be provided in the form of coins, bills, tickets, coupons, cards, etc. The payoff amounts are determined by one or more pay tables stored in the system memory 22.

Figure 3:
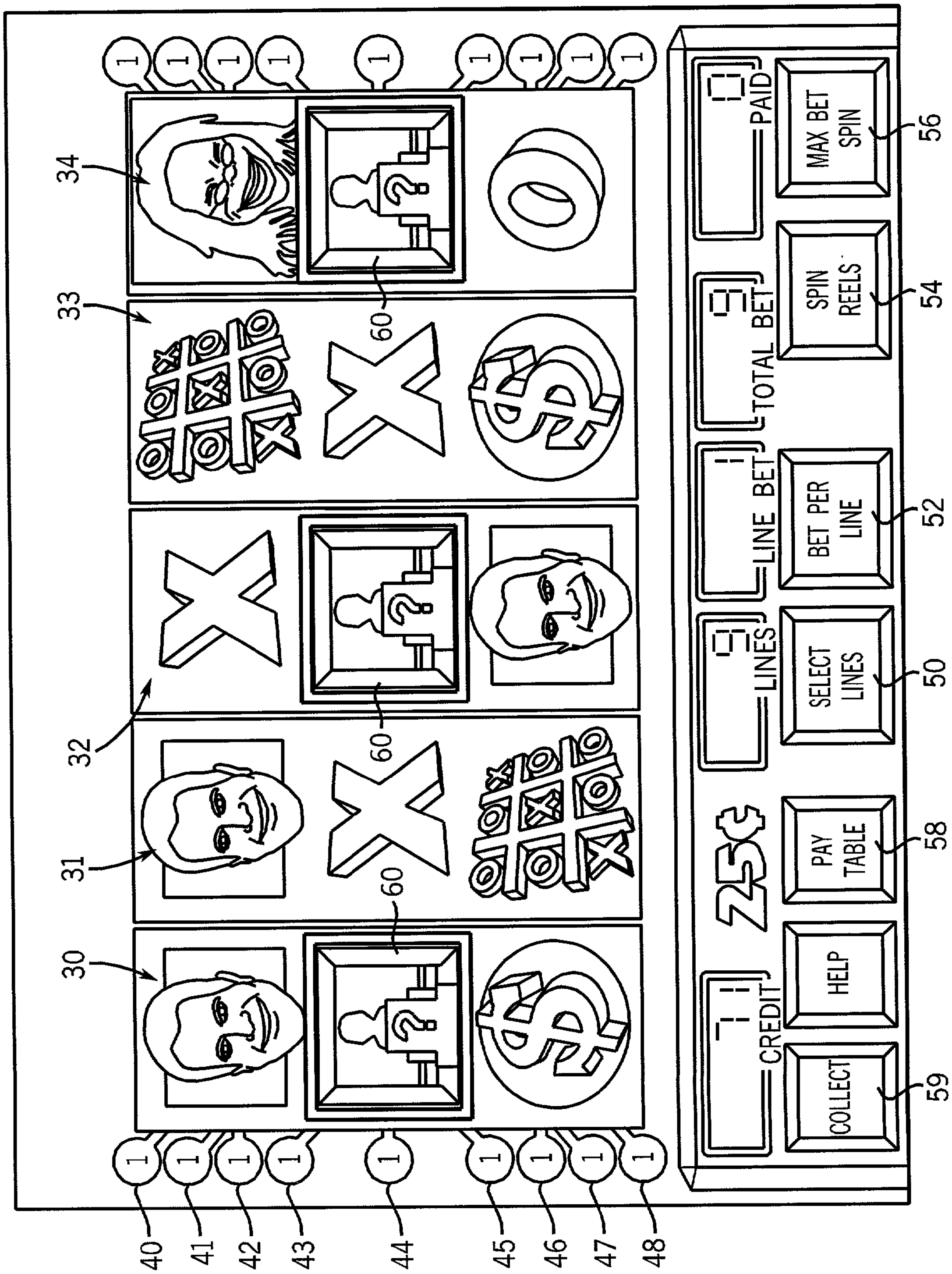
FIG. 3 is a display image associated with a basic slot game and showing a symbol combination for triggering a symbol matching feature.

Referring to FIG. 3, the basic game is implemented on the display 12 on five video simulated spinning reels 30–34 with nine pay lines 40–48. Each of the pay lines 40–48 extends through one symbol on each of the five reels 30–34. Generally, game play is initiated by inserting money or playing a number of credits, causing the CPU to activate a number of pay lines corresponding to the amount of money or number of credits played. In one embodiment, the player selects the number of pay lines (between one and nine) to play by pressing a "Select Lines" key 50 on the video display 12. The player then chooses the number of coins or credits to bet on the selected pay lines by pressing the "Bet Per Line" key 52.

After activation of the pay lines, the reels 30–34 may be set in motion by touching the "Spin Reels" key 54 or, if the player wishes to bet the maximum amount per line, by using the "Max Bet Spin" key 56 on the video display 12. Alternatively, other mechanisms such as, for example, a lever or push button may be used to set the reels in motion. The CPU uses a random number generator to select a game outcome (e.g., "basic" game outcome) corresponding to a particular set of reel "stop positions." The CPU then causes each of the video reels 30–34 to stop at the appropriate stop position. Video symbols are displayed on the reels 30–34 to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels 30–34 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing the "Collect" button 59. In one implementation, the winning combinations start from the first reel 30 (left to right) and span adjacent reels. In an alternative implementation, the winning combinations start from either the first reel 30 (left to right) or the fifth reel 34 (right to left) and span adjacent reels.

Included among the plurality of basic game outcomes is a start-feature outcome for triggering play of a symbol matching bonus feature. A start-feature outcome may be defined in any number of ways. For example, a start-feature outcome occurs when a special start-feature symbol or a special combination of symbols appears on one or more of the reels 30–34. The start-feature outcome may require the combination of symbols to appear along an active pay line, or may alternatively require that the combination of symbols appear anywhere on the display regardless of whether the symbols are along an active pay line. The appearance of the appropriate start-feature outcome causes the CPU to shift operation from the basic game to the symbol matching bonus feature of the present invention.

Figure 4:
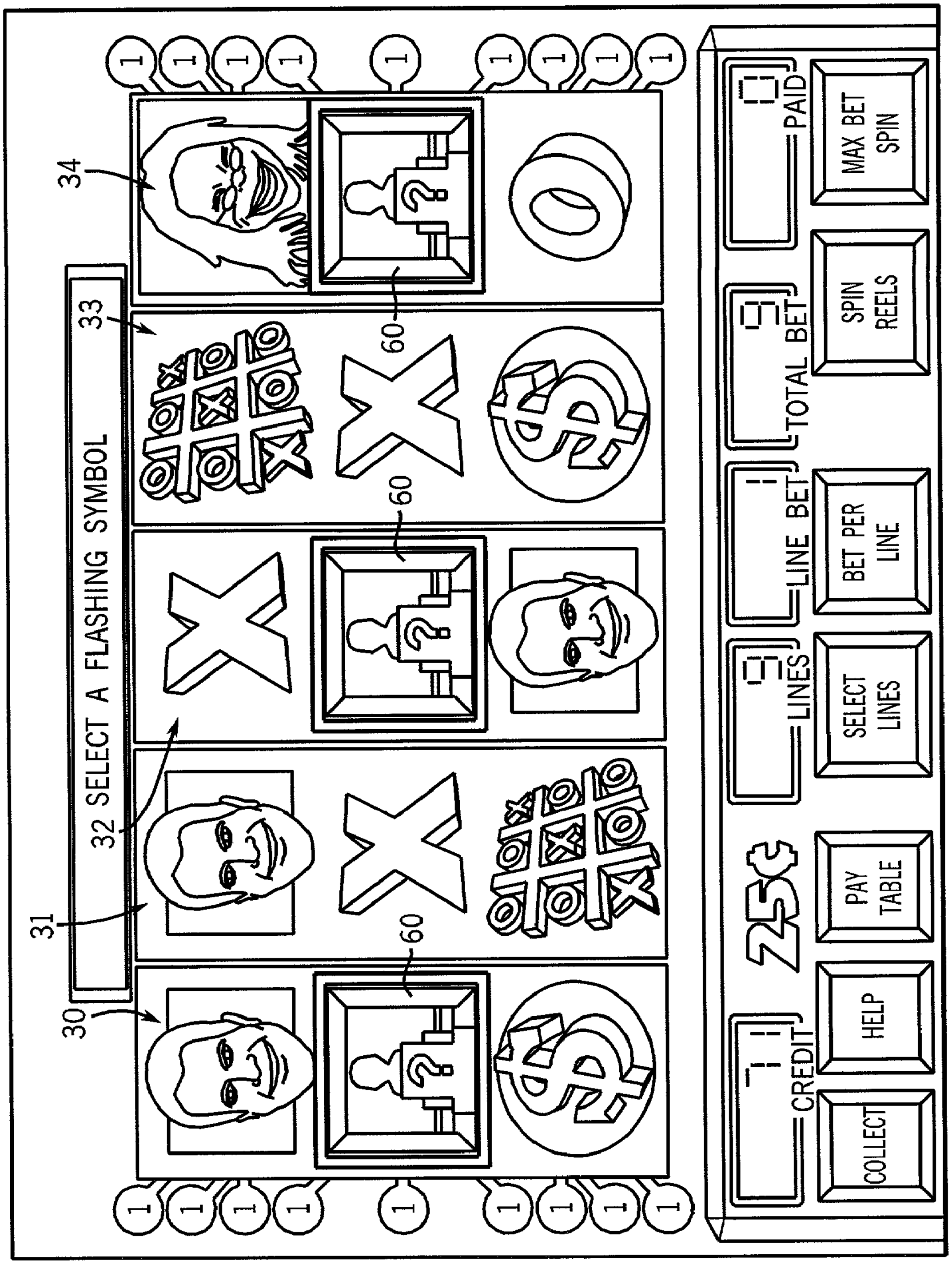
FIGS. 4 through 7 are display images associated with the symbol matching feature.

In the embodiment illustrated in FIG. 3, the appearance of three scattered CELEBRITY SCATTER symbols 60 anywhere on the display triggers a symbol matching bonus feature. The CELEBRITY SCATTER symbols 60 are highlighted using, for example, a flashing border. Referring to FIG. 4, the player is prompted to select one of the CELEBRITY SCATTER symbols 60 by, for example, touching the symbol that the player desires to select. The three CELEBRITY SCATTER symbols 60 are preferably associated with three different celebrities. The three celebrities may, for example, include Whoopi Goldberg, Rich Little, and Isaac Hayes. The three celebrities are randomly assigned to different ones of the CELEBRITY SCATTER symbols 60. In the illustrated example, the player selects the CELEBRITY SCATTER symbol 60 on reel 32.

Figure 5:
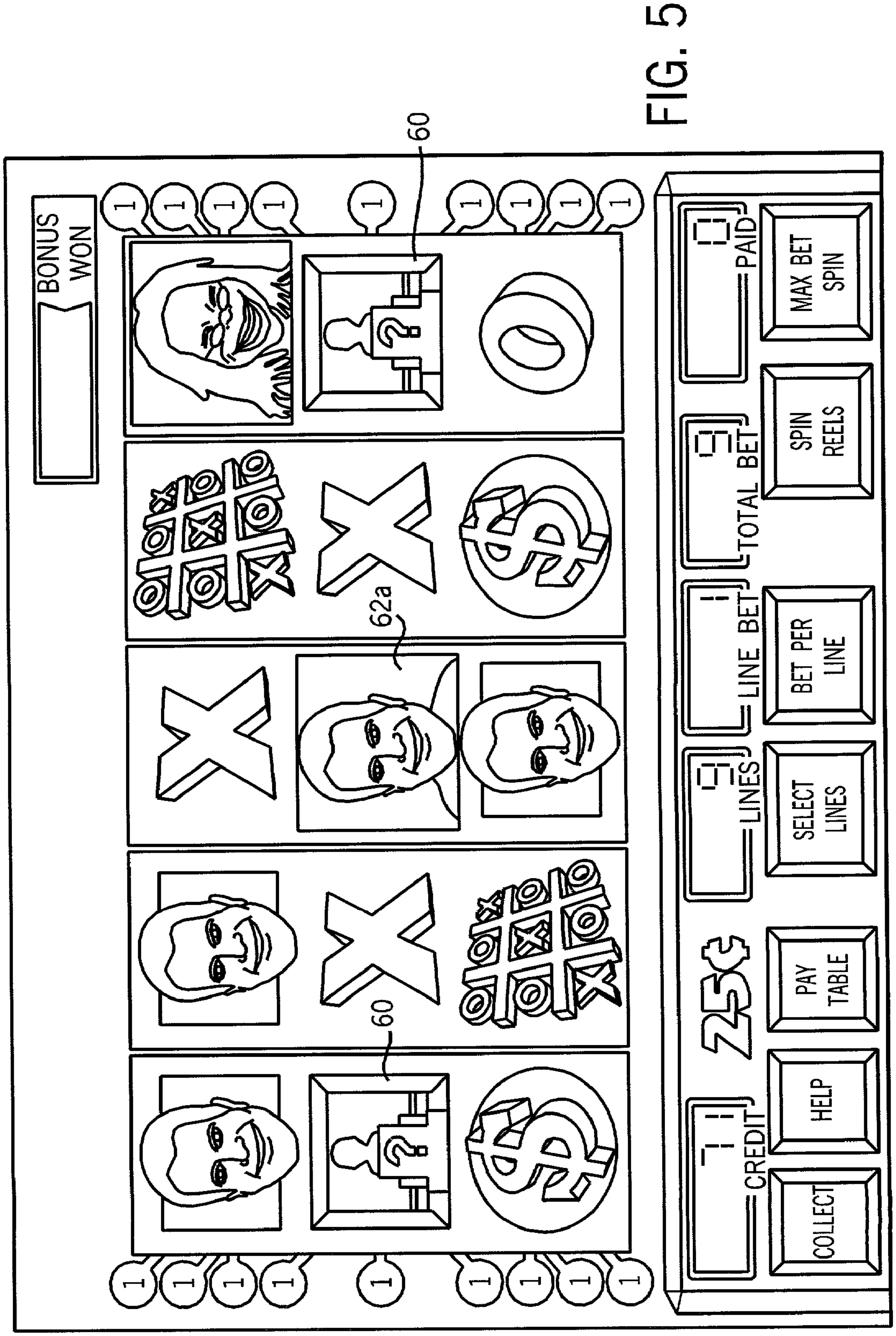
Figure 6:
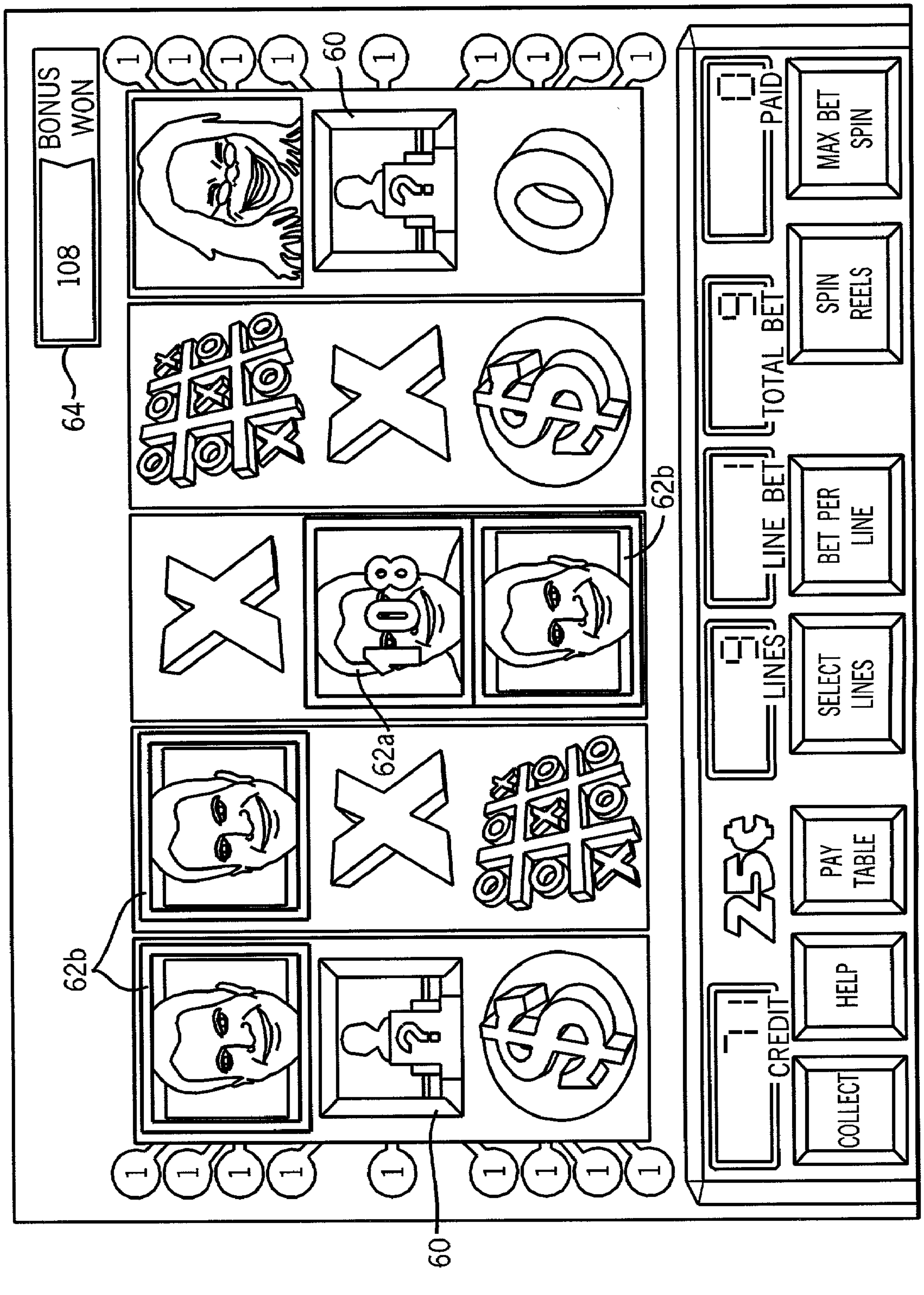

Referring to FIG. 5, the selected CELEBRITY SCATTER symbol 60 reveals a celebrity 62*a* (e.g., Rich Little) assigned to that symbol. Referring to FIG. 6, the CPU provides an award based on the revealed celebrity and any other celebrity symbols in the reel display that match the revealed celebrity. The award for each revealed celebrity and each matching celebrity symbol may, for example, be an absolute credit amount or a credit multiplier applied to the player's initial total wager. In a preferred embodiment, the award is a credit multiplier that varies depending upon which celebrity is revealed by the selected CELEBRITY SCATTER symbol 60. A possible pay table for the symbol matching feature appears below:

| Celebrity | Multiplier |
|---|---|
| Whoopi Goldberg | 5x |
| Rich Little | 3x |
| Isaac Hayes | 3x |

Figure 7:
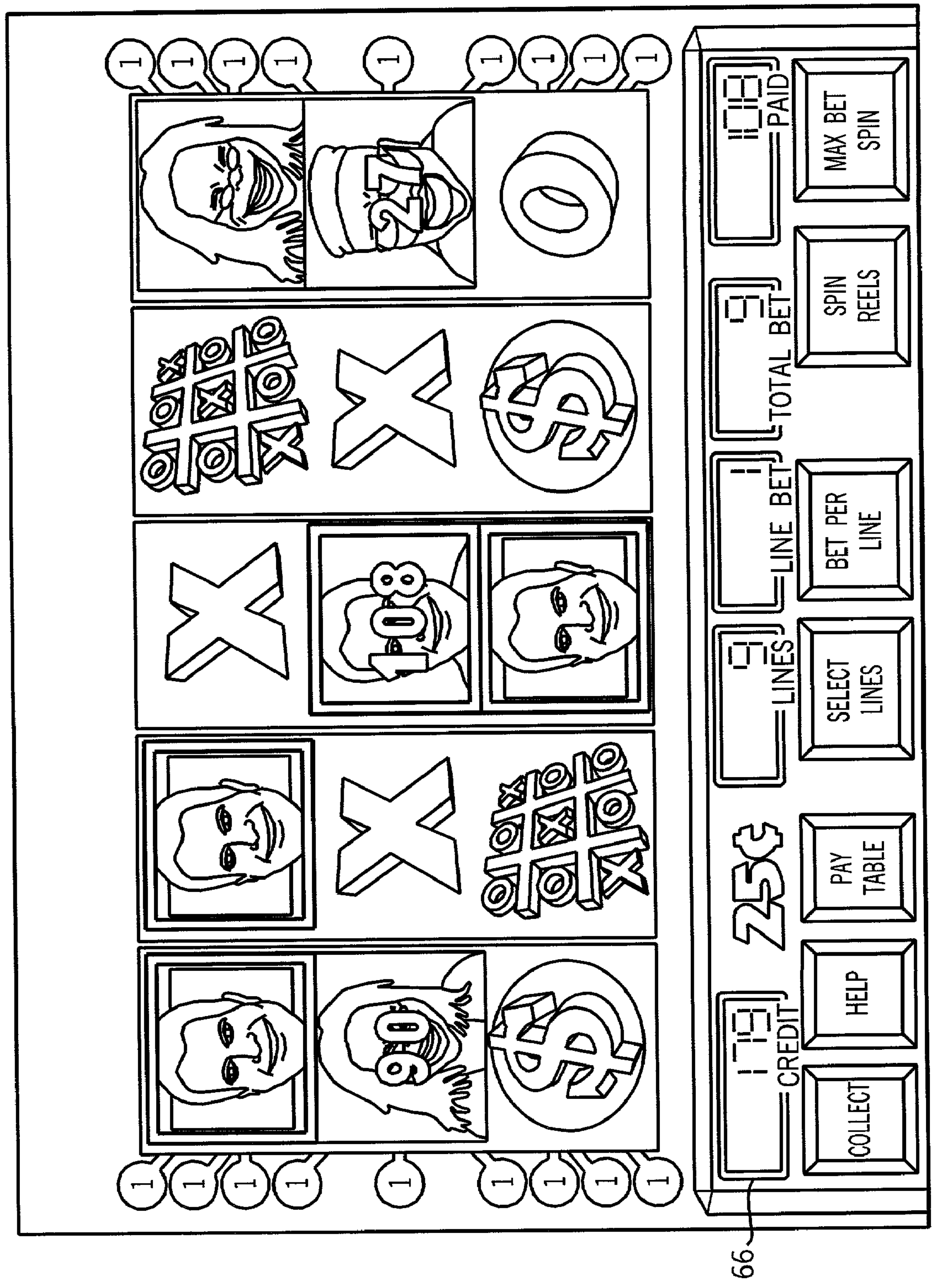

In the illustrated example the selected CELEBRITY SCATTER symbol 60 reveals Rich Little 62*a* (worth 3×), and the reel display includes three Rich Little symbols 62*b* (each worth 3×) that match the revealed Rich Little 62*a*. Therefore, the CPU provides a total award equal to the player's initial total wager multiplied by twelve (i.e., 3×+3×+3×+3× =12×). If the player's total wager is 9 credits, then the total award yielded by the symbol matching feature is 108 credits (i.e., 12×9=108). This bonus is shown in a bonus meter 64. Referring to FIG. 7, after incrementing a credit meter 64 by this bonus, the CPU shifts operation back to the basic slot game.

While the present invention has been described with reference to one or more particular embodiments, those skilled in the art will recognize that many changes may be made thereto without departing from the spirit and scope of the present invention. For example, instead of basing the award in the symbol matching feature on the reel symbols that match the symbol revealed by the selected symbol, the award may instead be based on reel symbols that have some other predefined association with the symbol revealed by the selected symbol. Instead of having the player select one of the CELEBRITY SCATTER symbols 60, the CPU may randomly select one of the symbols 60. Instead of assigning a different celebrity to each CELEBRITY SCATTER symbol 60, the CPU may be programmed to allow the same celebrity to be assigned to more than one of the CELEBRITY SCATTER symbols 60. Furthermore, the symbol matching feature may be played on a symbol array in which each symbol is generated independently of the other symbols. Each of these embodiments and obvious variations thereof is contemplated as falling within the spirit and scope of the claimed invention, which is set forth in the following claims.

What is claimed is:

1. A method of conducting a wagering game on a gaming machine, comprising:
- receiving a wager from a player;
- displaying a symbol array including a plurality of symbols, the plurality of symbols including a plurality of non-selected symbols and one or more selectable symbols, the selectable symbols being associated with respective indicium;
- selecting one of the one or more selectable symbols; and
- providing an award based on any other of the plurality of non-selected symbols matching the indicium of the selected symbol.

2. The method of claim 1, wherein the step of displaying a symbol array includes rotating and stopping a plurality of symbol-bearing reels to generate the symbol array.

3. The method of claim 1, wherein the one or more selectable symbols include at least two selectable symbols, and wherein the step of selecting one of the symbols includes selecting one of the at least two selectable symbols.

4. The method of claim 3, wherein the selected symbol reveals the respective indicium upon selection, and wherein the step of providing an award includes providing an award based on any other of the plurality of non-selected symbols that match the respective indicium.

5. The method of claim 3, wherein the selectable symbols are generic symbols adapted to reveal respective indicium upon selection.

6. The method of claim 5, wherein the award varies according to which of the respective indicium is revealed as a result of selecting one of the selectable symbols.

7. The method of claim 1, wherein the step of providing an award includes providing a payout for the selected symbol and for each of the non-selected symbols matching the selected symbol.

8. The method of claim 1, wherein the step of selecting one of the symbols is accomplished by the player.

9. A method of conducting a wagering game on a gaming machine, comprising:
- receiving a wager from a player;
- rotating and stopping a plurality of symbol-bearing reels to randomly place symbols on the reels in visual association with a display area, the symbols including a plurality of non-selected symbols and one or more selectable symbols, the selectable symbols being associated with respective indicium;
- selecting one of the one or more selectable symbols; and
- providing an award based on any other of the non-selected symbols matching the indicium of the selected symbol.

10. The method of claim 9, wherein the one or more selectable symbols include at least two selectable symbols, and wherein the step of selecting one of the one or more selectable symbols includes selecting one of the at least two selectable symbols.

11. The method of claim 10, wherein the selected symbol reveals the respective indicium upon selection, and wherein the step of providing an award includes providing an award based on any other of the plurality of non-selected symbols that match the respective indicium.

12. The method of claim 10, wherein the selectable symbols are generic symbols adapted to reveal respective indicium upon selection.

13. The method of claim 12, wherein the award varies according to which of the respective indicium is revealed as a result of selecting one of the selectable symbols.

14. The method of claim 9, wherein the step of selecting one of the symbols is accomplished by the player.

15. A method of conducting a wagering game on a gaming machine, comprising:
- receiving a wager from a player;
- rotating and stopping a plurality of symbol-bearing reels to randomly place symbols on the reels in visual association with a display area, the symbols including a plurality of non-selected symbols and one or more selectable symbols, the selectable symbols being associated with respective indicium;
- in response to the displayed symbols including the one or more selectable symbols, receiving a selection from the player of one of the one or more selectable symbols; and
- providing an award based on any other of the plurality of non-selected symbols matching the indicium of the selected symbol.

16. The method of claim 15, further including revealing the respective indicium at a location of the selected symbol in response to the step of receiving a selection from the player of one of the selectable symbols.

17. The method of claim 16, wherein the step of providing an award includes providing an award based on any other of the symbols that match the respective indicium.

18. A gaming machine comprising:
- a wagering apparatus for receiving a wager from a player;
- a display for displaying a symbol array including a plurality of symbols, the plurality of symbols including a plurality of non-selected symbols and one or more selectable symbols, the selectable symbols being associated with respective indicium;
- means for selecting one of the one or more selectable symbols; and
- an award apparatus for providing an award based on any other of the plurality of non-selected symbols matching the indicium of the selected symbol.

19. The machine of claim 18, wherein the display depicts a plurality of symbol-bearing reels that are rotated and stopped to generate the symbol array.

20. The machine of claim 18, wherein the plurality of symbols include at least two selectable symbols, and wherein the selecting means selects one of the selectable symbols.

21. The machine of claim 20, wherein the selected symbol reveals the respective indicium upon selection, and wherein the award apparatus provides an award based on any other of the symbols that match the respective indicium.

22. The machine of claim 20, wherein the selectable symbols are generic symbols adapted to reveal respective indicium upon selection.

23. The machine of claim 22, wherein the award varies according to which of the respective indicium is revealed as a result of the selecting means selecting one of the selectable symbols.

24. The machine of claim 18, wherein the award apparatus provides a payout for the selected symbol and for each of the plurality of non-selected symbols matching the selected symbol.

25. The machine of claim 18, wherein the selecting means is responsive to player input.

* * * * *